April 23, 1940.  J. PINAUD ET AL  2,198,228

RUBBER HEEL

Filed Nov. 16, 1936  2 Sheets-Sheet 1

INVENTOR.
John Pinaud
BY and Sidney Pinaud
Emery Varney Whittemore + Dix
ATTORNEYS.

April 23, 1940.  J. PINAUD ET AL  2,198,228
RUBBER HEEL
Filed Nov. 16, 1936  2 Sheets—Sheet 2
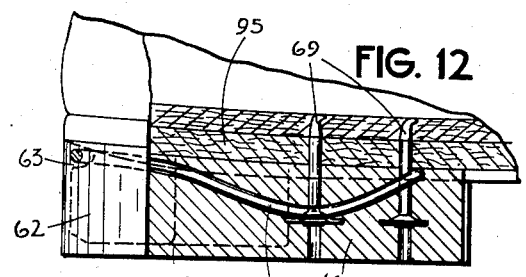
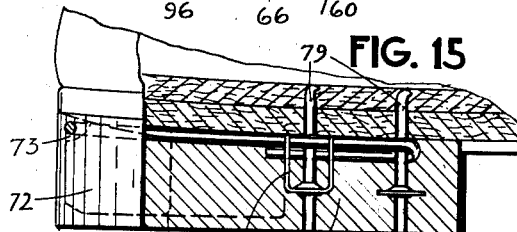
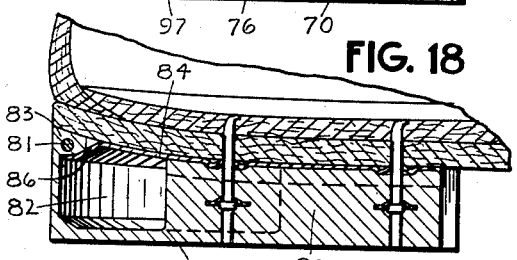
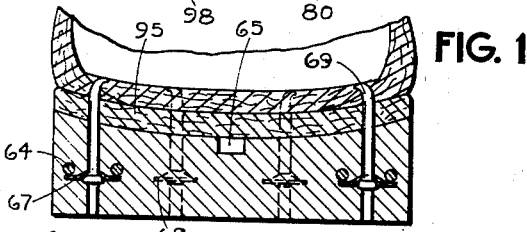
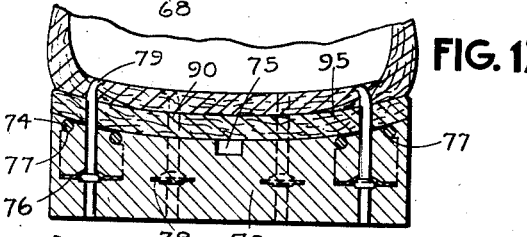
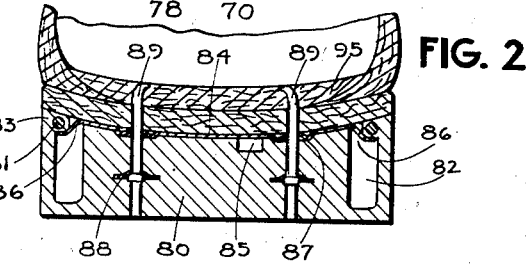
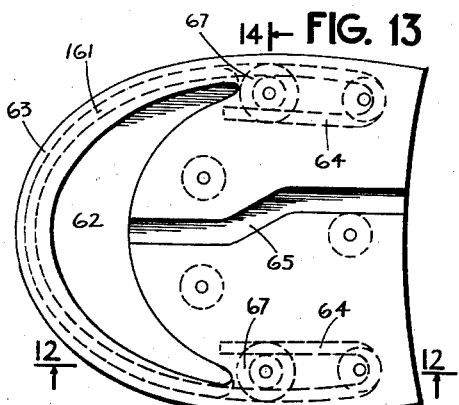
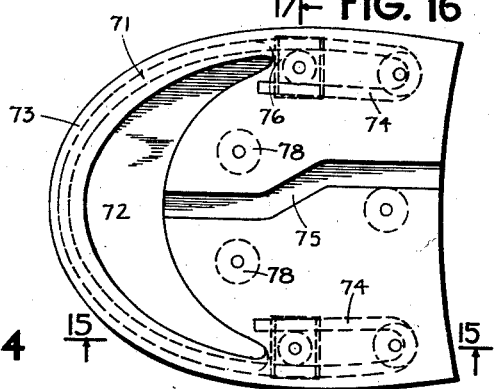
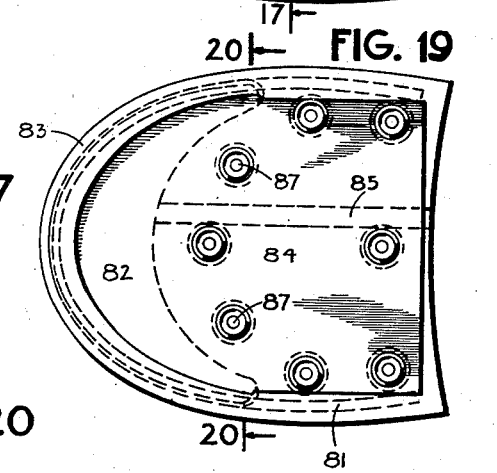
INVENTOR.
John Pinaud
and Sidney Pinaud
BY Emery Varney Whittemore + Dix
ATTORNEYS.

Patented Apr. 23, 1940

2,198,228

UNITED STATES PATENT OFFICE 2,198,228

RUBBER HEEL

John Pinaud and Sidney Pinaud, Atlantic Highlands, N. J.

Application November 16, 1936, Serial No. 111,014

5 Claims. (Cl. 36—35)

The invention relates to foot wear, and more particularly, a shoe heel.

The invention has for its primary object the improvement of certain details of construction of the heel covered by Patent No. 1,977,695, dated October 23, 1934. Some of the more specific objects of the invention are—to provide improved bonds between the top plate and the body of the heel; to provide improved ventilating systems for the heel; to provide improved attachments of the heel to the shoe; and to provide a novel reenforced heel.

The invention also consists in certain new and original features of construction and combination of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a top plan view of one form of heel according to the invention;

Figure 10:
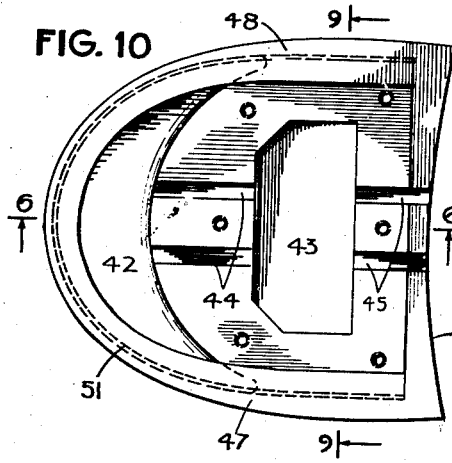
Figure 11:
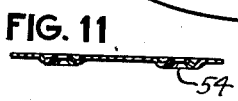
Figure 7:
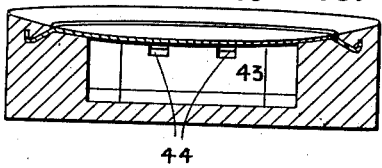
Figure 8:
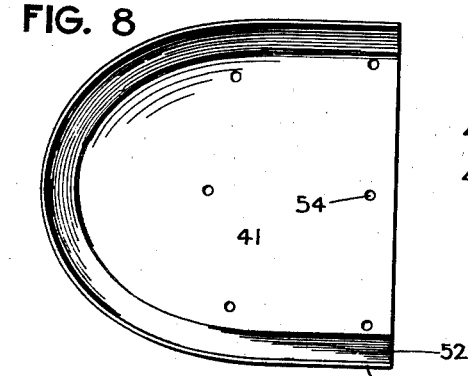
Figure 9:
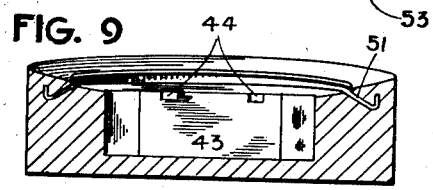

Fig. 7 corresponds to a section on the line 9—9 of Fig. 10 but showing the top plate assembled;

Fig. 8 is a top view of the top plate shown in Figs. 4–7;

Fig. 9 is a section on the line 9—9 of Fig. 10;

Fig. 10 is a top plan view of the heel body shown in Figs. 6–9 with the top plate removed;

Fig. 11 is a detail illustrating the manner in which the holes through the top plate may be punched;

Fig. 12 is a partial, vertical section through another form of heel taken on the line 12—12 of Fig. 13;

Fig. 13 is a top plan view of the heel of Fig. 12 before being applied to a shoe;

Fig. 14 is a section on the line 14—14 of Fig. 13;

Fig. 15 is a partial, vertical section through still another form of heel taken on the line 15—15 of Fig. 16;

Fig. 16 is a top plan view of the form shown in Fig. 15 before it is attached to the shoe;

Fig. 17 is a section on the line 17—17 of Fig. 16;

Fig. 18 is a vertical section through another form of heel construction;

Fig. 19 is a plan view of the heel illustrated in Fig. 18, but before it is fastened to the shoe; and Fig. 20 is a section on the line 20—20 of Fig. 19.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Figure 1:
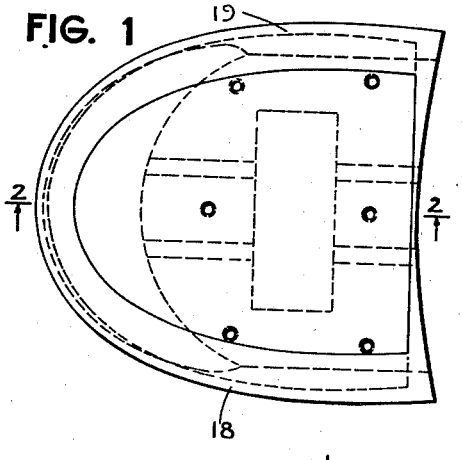
Figure 2:
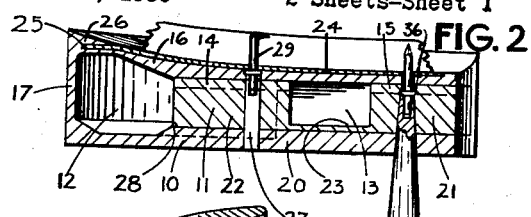
Fig. 2 is a section on the line 2—2 of Fig. 1 illustrating the attachment of the heel to a shoe.
Figure 3:
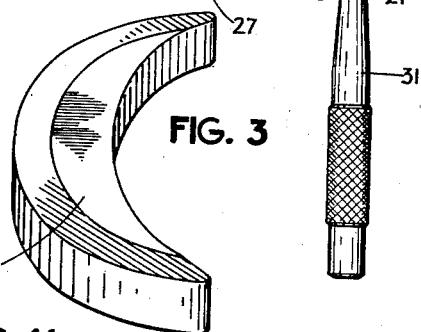
Fig. 3 is a perspective of a special insert of sponge rubber or other material which may be used in the rear cavity of the heel.

Referring now to the drawings, and more particularly to Figs. 1 and 2, the heel comprises a body 10 of rubber or other suitable resilient or elastic material having a plug 11 of similar or somewhat harder material cemented or otherwise secured in place. The heel is formed with a rear cavity 12 having a crescent shaped and a forward cavity 13. These cavities are connected by ducts 14 formed in the plug 11. Further ducts or passages 15 formed in the plug 11 connect forward cavity 13 with the front of the heel.

The heel body 10 further comprises a top wall 16, a curved back wall 17 and side walls 18 and 19 and bottom wall 20. Plug 11 has a forward part 21 and a rear part 22 and the cavity 13 is formed with the bottom wall 23.

The metal plate 24 is of curved configuration, as illustrated, and has a downwardly deflected rim 25 extending adjacent its side and back edges. During the molding of this heel, the top plate 24 is vulcanized in position, the top flap or flange, indicated by 26, overlapping the flange 25 along the sides and curved back thereof.

It will be understood that the body 10 and plug 11 are molded separately. During the molding of the body 10, a core is used to form the rear cavity 12 and the space to be occupied by the plug 11. After the body 10 of the heel is molded with the metal plate 24 in position, the core is removed and the plug 11 is cemented or otherwise secured in position.

For securing the heel to the sole of the shoe, special nails 29 may be provided. These nails have a collar 30 along the shank thereof, and are driven home by a special nail set or holder 31 having a recess for accommodating the shank of the nail 29. For driving the nail home, it will first be placed in the nail set 31, as indicated in Fig. 2, and inserted through one of the holes 27 in the heel and hammered in the usual way. This causes the point of the nail to be upset, as illustrated in Fig. 2, and the heel firmly locked to the sole of the shoe.

It will be understood that the back wall 17 and the part of the bottom wall 20 enclosing the rear cavity 12 are relatively thin and freely collapsible so that, when the foot is put down in walking, the part of the bottom wall 20 under the lower rear edge 28 of plug section 22 takes the impact. This point is substantially under the plantar tubercules of the os calcis. At this point support to the foot may be substantially non-yielding, but, if desired, it may be elastic or resilient to absorb shock when the heel strikes the ground in walking. The lower supporting edge 28 is curved (Fig. 1) to adapt the invention to persons who walk on the "outside" of the heel, as explained in the earlier patent.

Referring now to Figs. 6-10, in this form the body of the heel 40 is molded in one piece and the metal plate 41 is cemented or otherwise attached to the heel after the molding operation. In this form the rear crescent-shaped cavity is denoted by 42 and the forward cavity by 43. The ducts connecting the cavities are denoted by 44 and the ducts connecting the forward cavity 43 with the front of the heel are denoted by 45. The heel body 40 has a curved back wall 46 merging into side walls 47 and 48, the bottom wall 49 and the front wall 50.

For attaching the metal plate 41, the body 40 is molded with a horseshoe-shaped recess 51 extending along the side walls 47, 48 and intersecting rear cavity 42 at the back wall 46 of the heel. This recess 51 has a cross sectional configuration, as illustrated especially in Fig. 9, to cooperate with a metal plate 41 which has a downwardly deflecting flange 52 with an upwardly extending rim 53 extending along the sides and back of the plate. After the body 40 and the plate 41 are separately formed, plate 41 may be forced into position and secured to the body with or without the use of cement. The flexible condition of the rubber forming the body of the heel 40 permits inserting the metal plate 41 in to the position shown in Figs. 6 and 7.

For attaching the heel to the sole of the shoe, nail holes 54 are provided in the plate 41, these nail holes being punched upwardly so as to form conical mouths (Fig. 11) to help center the nails when they are driven through the holes 56 in the body 40. Washers 55 are molded in the body 40 in accordance with conventional practices to receive the heads of the ordinary attaching nails when they are inserted through the holes 56 and 54 for attachment to the sole of the shoe in the ordinary way.

Figure 4:
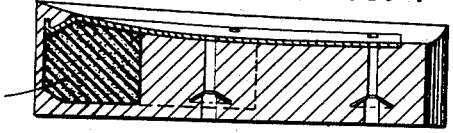
Fig. 4 illustrates a modified form of heel having but a single cavity in which an insert is disposed and having a modified form of attachment between metal top plate and heel body.
Figure 5:
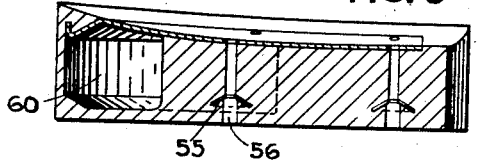
Fig. 5 is a further modified form similar to Fig. 4 but without the rubber insert.
Figure 6:
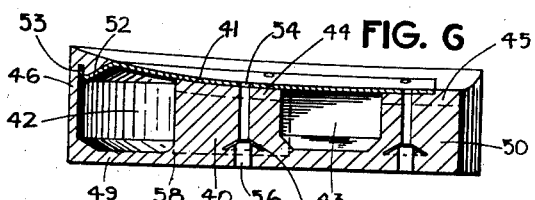
Fig. 6 is a further modification taken on the line 6—6 of Fig. 10 illustrating a form of heel having a front cavity in addition to the rear cavity.

Referring now to Fig. 5, in case a simpler heel is desired, the front recess 43 may be omitted and a single recess, indicated by 60, used in the rear of the heel. Other parts are of similar construction to that illustrated in Figs. 6-10. In Fig. 4, instead of having a hollow recess 60, an insert of relatively soft sponge rubber 61 may be inserted before assembling the top plate 41 in position.

An improved bonding action is obtained between metal plate 24 and body 10 in Figs. 1 and 2. A positive interlock between the rubber and the metal is obtained. Improved adhesion is obtained by vulcanizing the rubber to the metal in this manner. The metal plate 24 may be of any desired metal, such as steel, either stainless or otherwise, or steel plated with brass to improve the adhesion to the rubber. The embedding of the plate 24 into the rubber assists in holding the rear top edge of the heel up against the sole of the shoe.

A similarly improved bond is obtained between the plate 41 and body 40 in Figs. 4-10. Here an additional interlock is obtained between the rubber and the metal which not only prevents the rubber from being pulled down, but also prevents the rubber surrounding the rear cavity from being pulled out. Although the top plate 41 and heel body 40 may be separated when apart from the shoe, the attachment of the heel to the shoe positively prevents separation of the plate 41 and body 40. The interlock between the flanges 52, 53 of plate 41 and the back wall of the rear cavity 42 prevents the latter from being pulled down or out.

The special attachment between heel and shoe shown in Fig. 2 is of advantage in preventing the destruction of the adhesion between the cemented surface of the plug and heel body. The use of the cover plate 24 to take the holding action of the nails would ordinarily require a relatively short nail which, if driven by an ordinary nail punch, would upset before it could be driven home. The use of the special nail and nail set shown in Fig. 2 overcomes this disadvantage and permits driving the nail home so that the point thereof can be upset over the top of the shoe sole. The use of the flaring holes 54 in Figs. 4-10 accurately guides the nail so that it passes through the hole and can be driven home accurately.

The use of the separable plate in Figs. 4-10 permits the withdrawal of the cores forming the recesses in the molding operation and eliminates the necessity for a separate plug which must be cemented in place afterwards as in Fig. 2. The flanging of the top plates also strengthens them, permitting lighter metal to be used.

To take care of the compression of the air in the rear cavities 12 and 42, the vents 14 and 44 communicate with cavities 13 and 43, which in turn communicate with the outside. Ordinarily, no trouble will be experienced from water since the vents 15 and 45 are at the top of the heel. However, in case water does get into these vents, the forward cavities 13 and 43 act as traps preventing the water from reaching the rear cavities. In Figs. 1 and 2 the plug 11 is provided with an integral bottom wall 23 so that there is no cemented joint at the bottom of the cavity 13 through which water may leak to the rear cavity 12. The form shown in Fig. 5 having no vents, and the form shown in Fig. 4 using sponge rubber offer greater immunity against water seepage; but, of course, have the disadvantage of not being as freely collapsible as the other forms.

Referring now to Figs. 12-14, here the rubber heel body is denoted by 160, while the crescent-shaped collapsible rear cavity is denoted by 62 and impact-receiving edge by 96. A single ventilating duct 65 connects chamber 62 with the top of the front wall of the heel.

A stiff wire 161 is embedded in the heel body 160 during the molding operation. This wire has a curved portion embedded within a bead 63 at the top of the rear wall of chamber 62. The wire 161 has forward hairpin shaped ends 64, these ends being bent downwardly to form vertical arches indicated by 66. Washers 67 and 68 are embedded in the body 60 during the molding operation, washers 67 embracing the hairpin ends of the wire 161 for a purpose explained hereinafter, and washers 68 being the ordinary heel washers.

The usual nails 69 pass through the nail holes in the heel and through the washers 67 and 68 into the sole 95 of the shoe, the ends of the nails being bent over or upset on the inside of the shoe, as will be understood by those skilled in the art.

Referring now to Figs. 15-17, here the rubber body of the heel is indicated by 70 and has moulded therein a stiff wire, indicated by 71. The rear crescent-shaped cavity is denoted by 72 and is connected to the front of the heel by a duct 75. The impact-receiving edge is denoted by 97.

The wire 71 is provided with a curved portion embedded within a bead 73 formed at the top of the rear wall of cavity 72. The wire 71 also has forward hairpin ends 74, but does not have vertical arches similar to vertical arches 66 in Fig. 12. Embracing the hairpin ends 74 are U-shaped clips 76, the legs of these clips having notches 77 for seating the ends 74 of the wire 71.

The usual nails 79 and 90 attach the heel to the sole 95 of the shoe, these nails being upset or bent over in accordance with well known practice. Nails 79 pass through the U-shaped clips 76, these clips having flared openings to permit easy threading of the nails through the openings. Nails 90 pass through the usual washers 78 embedded in the body 70.

Referring to Figs. 18-20, in this form the rubber heel body is indicated by 80, the crescent-shaped rear cavity by 82, and the impact-receiving edge by 98. This cavity has a duct 85 connecting with the front of the heel.

Molded within the heel is a stiff wire 81, the rear curved portion of the wire being embedded within a bead 83 at the top of the rear wall of cavity 82. The forward ends of wire 81 are embedded in the body 80, as shown, there being no hairpin ends or vertical arches in this form.

A plate 84, which may be of metal, has a curved rear flange 86 disposed under the curved bead 83 and a front portion disposed on top of the body 80. This plate has a series of flared openings 87 for the easy threading of nails 89. The body 80 of the heel has the usual washers 88 embedded therein for receiving the nails 89.

In Figs. 12-20, the stiff wire may be of circular cross section or of any other cross sectional form. It is preferably hardened steel, brass plated, or otherwise treated, to cause it to adhere to the rubber during the molding operation. In all forms, the embedded wire serves to stiffen the upper edge of the rear wall of the collapsible rear chamber, causing it to retain engagement against the sole of the shoe. Furthermore, after the heel is cemented to the shoe, the stiffness of the wire makes it much more difficult to pull apart the cemented surfaces between heel and shoe for the reason that any force acting on the collapsible walls is distributed by the wire over a larger area. The embedding of the wire in the heel body during the molding operation is also cheaper than the molding of a groove in the rubber, as in Figs. 4-10.

It is necessary that the upper edge of the rear wall of the collapsible rear cavity firmly engage the sole of the shoe. Hence, during the molding operation of Figs. 12-14 it may be desirable to deflect the wire (within its elastic limit) from the shape shown in Fig. 12 by applying an upward pressure at the vertical arch portions 66. The heel is then molded with the wire stressed in this manner. Thus, when the heel is removed from the mold, the wire will spring back to its normal unstressed form, causing the rear and front of the heel to arch slightly upwardly with respect to the middle portion of the heel. When the heel is fastened to the shoe, the application of the nails 69 against the vertical arch portions of the wire will straighten out the heel and place the wire under tension, forcing the rear edge of the heel firmly against the sole, as shown in Fig. 12.

Instead of using a mold which will give a flat bottom to the heel and deflecting the wire from its normal free shape, as above described, the mold itself may be curved slightly from front to rear of the heel. In this case, it is not necessary to put the wire under initial tension during molding. When such a heel is fastened to the shoe, the stresses of the fastening elements will straighten the heel, causing the induced tension of the wire to force the rear edge of the heel firmly against the sole.

The downward arching of the hairpin ends 64 in Figs. 12-14, and the U-shaped clips 76 in Figs. 15-17, provide constructions in which certain nails have direct rigid engagement with the embedded wires without requiring special nails, as in Fig. 2. The attaching force is thus directly applied to critical points in the embedded wires for holding the rear edges of the heels permanently against the soles of the shoe.

In the form shown in Figs. 18-20, it is not necessary that the nails directly engage the plate 84 since this plate is supported by the rubber body over a large area. The direct engagement between the flange 86 on this plate and the bead 83 provides the necessary support to hold the rear edge of the heel up against the sole of the shoe.

It will be understood that, in addition to metal, the top plates in Figs. 1-11 and 18-20 may be made of any other stiff sheet material, such as so-called composition sheet materials having the necessary structural properties. The wires in Figs. 12-20 may also be of suitable composition material.

The washers in the several figures above described (except Figs. 1 and 2) may be embedded at such a distance from the bottom surface of the heel that the fastening nails may be driven home by blows of the ordinary shoemaker's hammer without requiring any punch or nail set. This not only simplifies the operation of applying the heel to the shoe, but also prevents exerting too much pressure on the heel which might cause it to bulge out at the sides.

In the forms above described (except Figs. 1 and 2), it will be noted that the entire heel body is molded in one piece. Since the rubber must have considerable flexibility to permit the free collapsing of the rear cavity, the use of such a grade rubber throughout the entire body of the heel imparts a certain resiliency or "give" to the forward shock-receiving edge of the rear cavity.

The use of a resilient material at this point has the advantage of giving a softer walking action, making the heel more nearly approximate the effect of walking barefooted on soft earth.

It will be understood that the forward walls 28 and 58 of the rear recess in Figs. 1-11, and the corresponding points in Figs. 12-20, are placed substantially under the plantar tubercules of the os calcis or calcaneum at the instant the heel strikes the ground in walking, the reasons for this construction and the advantages thereof being fully set forth in the earlier patent above referred to.

While certain novel features of the invention have been disclosed and are pointed out in the annexed claims, it will be understood that various omissions, substitutions and changes may be made by those skilled in the art without departing from the spirit of the invention.

What is claimed is:

1. In a heel structure for a shoe or the like, a heel body having side walls and a curved back wall, said heel body having a rear cavity making said back wall collapsible, the top of said curved back wall having a bead, a reenforcing wire having its curved back portion embedded in said bead and having looped portions embedded in the body of the heel, said wire being arched downwardly adjacent said looped portions, washers embedded in said body, certain of said washers being located under and adjacent said arched portions.

2. In a heel structure for a shoe or the like, a heel body having side walls and a curved back wall, said heel body having a rear cavity making said back wall collapsible, a reenforcing wire having its curved back portion embedded in the top of said curved back wall and having front portions embedded in the body of the heel, said wire being arched downwardly between its front and back portions, washers embedded in said body, certain of said washers being located adjacent said arched portions.

3. In a heel structure for a shoe or the like, a heel body having side walls, a curved back wall, and a rear cavity having collapsible walls, a reenforcing wire having its curved back portion embedded in the top of said curved back wall and having front portions embedded in the body of the heel.

4. A heel for a shoe or the like having a cavity near the rear thereof and having collapsible walls, a flexible body forward of said cavity, a reenforcing wire embedded in the upper edges of said collapsible walls and in the body of the heel, the whole heel being curved upwardly at its front and rear ends to enable the rear collapsible portion to be held tightly against the sole of the shoe when the body of the heel is fastened to the sole.

5. In a shoe or the like, a shoe base, a heel having side walls and a curved back wall, said heel having a rear cavity making said back wall collapsible and a body portion in front of said cavity, a reenforcing wire embedded in the top of said back wall and anchored in said body portion, and fastening members passing through said body portion and through said base for firmly securing the heel to the shoe, said reenforcing wire providing a cantilever support for said curved back wall to hold it firmly against the shoe base.

JOHN PINAUD.
SIDNEY PINAUD.